Jan. 22, 1952  G. STARRE  2,583,310
TEMPLET FOR CENTERING LOOSE OBJECTS
Filed June 3, 1949
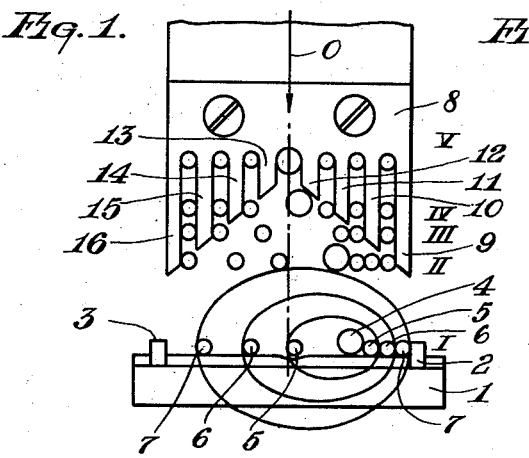
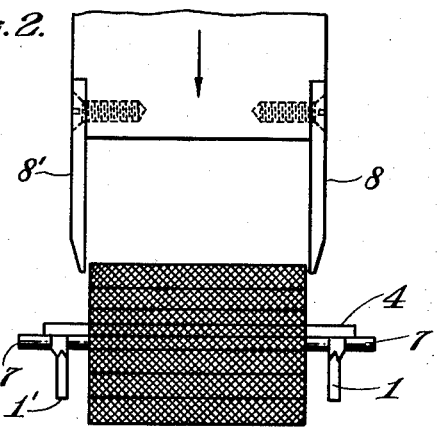
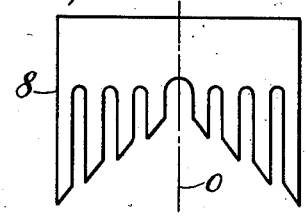
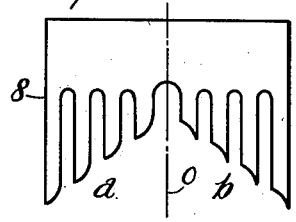
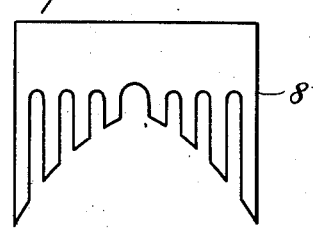
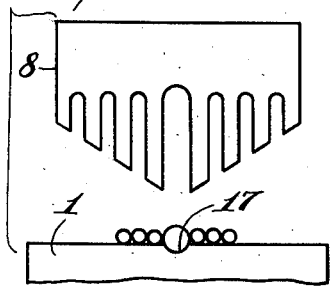
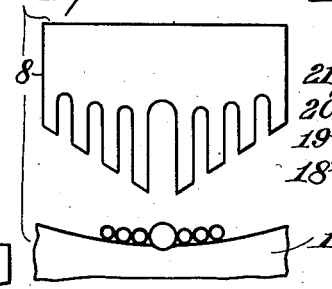
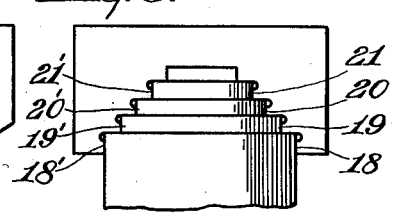
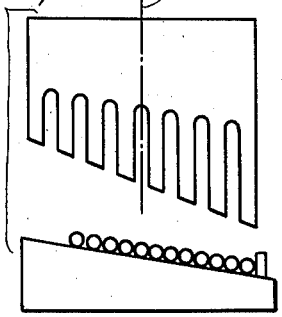
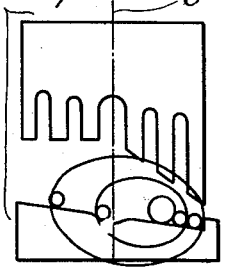
INVENTOR.
GERRIT STARRE
BY
AGENT.

UNITED STATES PATENT OFFICE 2,583,310

TEMPLET FOR CENTERING LOOSE OBJECTS

Gerrit Starre, Eindhoven, Netherlands, assignor to Hartford National Bank and Trust Company, Hartford, Conn., as trustee Application June 3, 1949, Serial No. 97,019
In the Netherlands June 15, 1948

12 Claims. (Cl. 33—174)

This invention relates to toothed templets for centring loose and preferably cylindrical objects by displacement at right angles to the longitudinal axis of the objects, and more particularly for centring electrodes for electric discharge tubes, to machines comprising such templets and to objects manufactured with the use of such machines.

In many cases loose objects placed in a determined position are desired to be exactly centred by means of a toothed templet and secured in order to provide supporting members and the like without the objects during this securing operation varying their mutual positions. Such is the case, for example, in assembling electrodes to form an electrode system in which operation, prior to the arrangement of the centring members, the electrodes are provisionally fixed in position by means of a toothed templet. A disadvantage of known templets is that the objects must substantially occupy their correct positions in order to ensure that they mesh with the correct teeth of the templet. However, this spacing operation prior to the arrangement of the templet takes a considerable time and, furthermore, difficulties readily occur since the objects as a result of a light shock or contact are liable to be mutually shifted so that the teeth of the templet may fail to mesh therewith.

This disadvantage is fully obviated if in the case of a toothed templet for centring, by means of displacement at right angles to the longitudinal axis, loose and preferably cylindrical objects, according to the invention, the teeth of the templet have a different average length, whilst the sides of each tooth extend substantially in parallel and have different lengths in such manner that at least from one side of the templet to the centre line thereof the length of the parallel sides of the teeth varies in the same sense. This variation may be symmetrical with respect to the centre line, that is to say from the two outer sides to the centre line with decreasing or with increasing average length. The extremities of the teeth may be cut-off according to an inclined straight line or curved line, while it is also possible to choose the adjacent parallel sides of two subsequent teeth of equal length. By cutting off the extremities of the teeth according to curved lines it may be ensured that the displacement of the objects begins gradually, or begins abruptly and ceases gradually. If desired, the teeth of the greatest average length may be provided near the centre line, the average length of the teeth decreasing towards the two outer sides. In this case, the objects will have to be laid down to be loose in such manner that the central one substantially occupies the correct position. The other objects then surely mesh with the correct teeth.

The operation of a machine and a templet according to the invention will now be explained more fully by reference to the accompanying drawing, in which:

Figs. 1 to 8 show embodiments of templets according to the invention.

The example chosen is a machine which may be used in a machine for mounting coaxial tubular elements such as described in Serial No. 790,009 filed December 6, 1947, which is now abandoned. Cylindrical electrodes 4, 5, 6, 7 of an electric discharge tube are set by letting them fall down so that they are placed one surrounding another but at random mutual distances and are placed with the use of moving clamps in a horizontal position on a pair of parallel supporting edges 1 and 1' provided on a mounting plate. If desired, provision may be made of two abutments 2 and 3 in order to ensure that the electrodes are within the reach of the templet. A templet 8 has a number of teeth 9 to 16 which correspond with the number and the size of the electrodes and which in this case decrease in length from the outer sides of the templet 8 towards the centre line O. The extremities of the teeth are bevelled, the bevelled extremities lying on two straight lines each line extending from one of the outer sides of the templet to the centre line, and the lines intersecting on the centre line O.

Assuming, in the most disadvantageous case, that all the electrodes are located at one side in position I. When the templet 8 moves downwards, the tooth 9 on account of the bevelled extremity thereof will at first displace the outer electrode so that the electrodes with respect to the templet reach the position II. At the same time, the electrodes 4, 5, 6 are shifted since they engage the supporting rod of grid 7. Since this supporting rod exactly fits between the teeth 9 and 10, the extreme edge of tooth 10 will penetrate between the supporting rods for the electrodes 7 and 6 whereupon position III is reached. Finally, the electrodes in position V are wholly centred and fixed by the templet.

Fig. 2 is a side view of the device and the electrodes, from which it may be seen that two templets 8 and 8' are used.

The extremities of the teeth may alternatively be shaped as shown in Figs. 3, 4 (a, b) or 5. As an alternative, it is possible to provide the longest teeth at the centre line O as shown in Fig.

6a or 6b, in which event the supporting edges must exhibit a cavity to receive the cathode. It is alternatively possible to provide that the length of the teeth from one side of the templet to the other decreases regularly (Fig. 7a), in which event the supporting edges 1 may be inclined to one side so that the electrodes held in position at the lowest part of the supporting edges are 1 by an abutment at the side of the longest tooth. In this arrangement use could alternatively be made of a templet as shown in Fig. 7b. The arrangement shown in Fig. 7a is also applicable in spacing cylindrical bodies, such as rods as shown in this figure, for example for the manufacture of street gratings, cages, baby-boxes, gates, steel ladders, and the like.

It is not necessary that the teeth should be located in one plane. For the coaxial arrangement of cylinders one surrounding another, use may be made of the arrangement shown in Fig. 8, which is a plan view of a templet. The cylinders engage with their extremities supporting edges having a height equal to the diameter of the cylinders so that the centre lines of the cylinders are located in one plane. The cylinders may be arranged coaxially and secured provisionally by means of a templet having teeth 18, 19, 20, 21 and 18', 19', 20' and 21' staggered in the longitudinal axis of the cylinders, the length of the teeth and the shape of the extremities thereof being suitably chosen. Such a case may occur in manufacturing coaxial conductors relatively separated by insulating material, which conductors are drawn out to a small diameter. In this case exact centering of the conductors with respect to one another is of great importance. Subsequent to centering and securing with the use of the templet shown in Fig. 8, a dry insulating powder is poured between the cylinders and shaken down to form a compact insulating intermediate layer, whereupon the extremities of the conductors are sealed and the whole may be swaged out and drawn to be used to form cylindrical condensers or electrode systems, for example, as described and claimed in U. S. Patent 2,538,873, patented on January 23, 1951.

As shown in Fig. 2, two identical templets will, as a rule, be employed. If loose rods are required to be spaced in such manner that the rods are not parallel after spacing but are arranged, for example, in a fan-like manner, one templet will have teeth of greater width than the other. Such may be the case in manufacturing backs of chairs. Furthermore, the supporting edges need not necessarily be plane but may be curved in the event that the rods are not required to be arranged in one plane. In this case a templet as shown in Fig. 6b is particularly suitable.

The invention is of importance for the manufacture of electrode systems for discharge tubes, street gratings of wood or metal, walking gratings for engine rooms in ships, gates, cages, baby-boxes, in short for all objects in which a number of cylindrical elements are required to be placed in a determined position with respect to one another and provisionally secured.

What I claim is:

1. A templet for centering loose and preferably cylindrical objects by displacement at right angles to the longitudinal axis of said objects, comprising; a substantially flat plate member, a plurality of teeth comprised in said flat plate member, said teeth having an unequal average length, each of said teeth having the two sides thereof extending substantially parallel to each other, each of said two sides being of unequal length, said lengths of all of said sides of said teeth varying in the same sense in the direction from one side of said plate member to the center line thereof.

2. A templet for centering loose and preferably cylindrical objects by displacement at right angles to the longitudinal axis of said objects, comprising; a substantially flat plate member, a plurality of teeth comprised in said flat plate member, said teeth having an unequal average length, each of said teeth having the two sides thereof extending substantially parallel to each other, each of said two sides being of unequal length, said lengths of all of said sides of said teeth varying in the same sense in the direction from either side of said plate member to the center line thereof.

3. A templet for centering loose and preferably cylindrical objects by displacement at right angles to the longitudinal axis of said objects, comprising; a substantially flat plate member, a plurality of teeth comprised in said flat plate member, said teeth having an unequal average length, each of said teeth having the two sides thereof extending substantially parallel to each other, each of said two sides being of unequal length, said lengths of all of said sides of said teeth varying in the same sense in the direction from either side of said plate member to the center line thereof, the average length of said teeth decreasing from both of said sides to said center line.

4. A templet for centering loose and preferably cylindrical objects by displacement at right angles to the longitudinal axis of said objects, comprising; a substantially flat plate member, a plurality of teeth comprised in said flat plate member, said teeth having an unequal average length, each of said teeth having the two sides thereof extending substantially parallel to each other, each of said two sides being of unequal length, said lengths of all of said sides of said teeth varying in the same sense in the direction from either side of said plate member to the center line thereof, the average length of said teeth increasing from both of said sides to said center line.

5. A templet for centering loose and preferably cylindrical objects by displacement at right angles to the longitudinal axis of said objects, comprising; a substantially flat plate member, a plurality of teeth comprised in said flat plate member, said teeth having an unequal average length, each of said teeth having the two sides thereof extending substantially parallel to each other, each of said two sides being of unequal length, said lengths of all of said sides of said teeth varying in the same sense in the direction from one side of said plate member to the center line thereof, the extremities of said teeth presenting a sloping intermittent edge such that the longest side of a given shorter one of said teeth has a length no more than equal to that of the shortest side of a longer one of said teeth adjacent to said shorter tooth.

6. A templet for centering loose and preferably cylindrical objects by displacement at right angles to the longitudinal axis of said objects, comprising; a substantially flat plate member, a plurality of teeth comprised in said flat plate member, said teeth having an unequal average length, each of said teeth having the two sides thereof extending substantially parallel to each other, each of said two sides being of unequal length, said lengths of all of said sides of said teeth varying in the same sense in the direction from one side of said plate member to the center line thereof, the extremities of said teeth presenting a sloping intermittent edge located in a curve.

7. A templet for centering loose and preferably cylindrical objects by displacement at right angles to the longitudinal axis of said objects, comprising; a substantially flat plate member, a plurality of teeth comprised in said flat plate member, said teeth having an unequal average length, each of said teeth having the two sides thereof extending substantially parallel to each other, each of said two sides being of unequal length, said lengths of all of said sides of said teeth varying in the same sense in the direction from one side of said plate member to the center line thereof, the extremities of said teeth presenting a sloping intermittent edge located in a straight line.

8. A templet for centering loose and preferably cylindrical objects by displacement at right angles to the longitudinal axis of said objects, comprising; a substantially flat plate member, a plurality of teeth comprised in said flat plate member, said teeth having an unequal average length, each of said teeth having the two sides thereof extending substantially parallel to each other, each of said two sides being of unequal length, said lengths of all of said sides of said teeth varying in the same sense in the direction from one side of said plate member to the center line thereof, the extremities of said teeth presenting a sloping intermittent edge located in a curve.

9. A templet for centering loose and preferably cylindrical objects by displacement at right angles to the longitudinal axis of said objects, comprising; a substantially flat plate member, a plurality of teeth comprised in said flat plate member, said teeth having an unequal average length, each of said teeth having the two sides thereof extending substantially parallel to each other, each of said two sides being of unequal length, said lengths of all of said sides of said teeth varying in the same sense in the direction from either side of said plate member to the center line thereof, the extremities of said teeth presenting an intermittent edge located in two straight lines each extending from one of said sides and intersecting at said center line.

10. A templet for centering loose and preferably cylindrical objects by displacement at right angles to the longitudinal axis of said objects, comprising; a substantially flat plate member, a plurality of teeth comprised in said flat plate member, said teeth having an unequal average length, each of said teeth having the two sides thereof extending substantially parallel to each other, each of said two sides being of unequal length, said lengths of all of said sides of said teeth varying in the same sense in the direction from one side of said plate member to the center line thereof, the extremities of adjacent ones of said teeth being in different planes.

11. A machine for centering loose and preferably cylindrical objects by displacement at right angles to the longitudinal axis of said objects, comprising; a pair of substantially identical flat plate members disposed in parallel relationship, a plurality of teeth comprised in each of said flat plate members, said teeth having an unequal average length, each of said teeth having the two sides thereof extending substantially parallel to each other, each of said two sides being of unequal length, said lengths of all of said sides of said teeth varying in the same sense in the direction from one side of each of said plate members to the center lines thereof, said identical flat plate members being further disposed that the teeth thereof are substantially in alignment.

12. A machine for centering loose and preferably cylindrical objects by displacement at right angles to the longitudinal axis of said objects, comprising; a pair of substantially identical flat plate members disposed in parallel relationship, a plurality of teeth comprised in each of said flat plate members, said teeth having an unequal average length, each of said teeth having the two sides thereof extending substantially parallel to each other, each of said two sides being of unequal length, said lengths of all of said sides of said teeth varying in the same sense in the direction from one side of each of said plate members to the center lines thereof, and mounting means for supporting the cylindrical objects to be centered, said mounting means presenting a surface in a plane which substantially coincides with the plane of a line located in the extremities of the apertures separating adjacent teeth.

GERRIT STARRE.

REFERENCES CITED

The following references are of record in the file of this patent:

UNITED STATES PATENTS

| Number | Name | Date |
|---|---|---|
| 170,959 | Lovell | Dec. 14, 1875 |
| 513,596 | Poole | Jan. 30, 1894 |
| 1,389,486 | Brewer | Aug. 30, 1921 |
| 1,860,174 | Cronk | May 24, 1932 |
| 2,337,056 | Mathias | Dec. 25, 1943 |
| 2,419,280 | Neff | Apr. 22, 1947 |
| 2,425,127 | Schafer | Aug. 5, 1947 |